United States Patent
Hsu et al.

(10) Patent No.: US 10,630,086 B2
(45) Date of Patent: Apr. 21, 2020

(54) PROGRAMMABLE BATTERY SOURCE ARCHITECTURE AND METHOD THEREOF

(71) Applicant: INDUSTRIAL TECHNOLOGY RESEARCH INSTITUTE, Hsinchu (TW)

(72) Inventors: Chien-Tung Hsu, Xihu Township (TW); Shou-Hung Ling, Hsinchu (TW); Kai-Cheung Juang, Hsinchu (TW); Tzi-Cker Chiueh, Taipei (TW); Chuan-Yu Cho, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 849 days.

(21) Appl. No.: 14/583,266

(22) Filed: Dec. 26, 2014

(65) Prior Publication Data

US 2016/0164315 A1 Jun. 9, 2016

(30) Foreign Application Priority Data

Dec. 8, 2014 (TW) ............................... 103142540 A

(51) Int. Cl.
*H02J 7/00* (2006.01)
*B60L 58/14* (2019.01)
(Continued)

(52) U.S. Cl.
CPC ............ *H02J 7/0024* (2013.01); *B60L 58/13* (2019.02); *B60L 58/14* (2019.02); *B60L 58/16* (2019.02);
(Continued)

(58) Field of Classification Search
CPC ...... H02J 7/0021; H02J 7/0068; H02J 7/0073; H02J 7/0024; H02J 7/0063;
(Continued)

(56) References Cited

U.S. PATENT DOCUMENTS 3,872,457 A * 3/1975 Ray .................. G01R 19/16542
340/518
5,459,671 A 10/1995 Duley
(Continued)

FOREIGN PATENT DOCUMENTS

| TW | 102823133 A | 12/2012 |
|----|-------------|---------|
| TW | I398068 B | 6/2013 |
| TW | 104167775 A | 11/2014 |

OTHER PUBLICATIONS

"Building Battery Arrays with Lithium-Ion Cells", Micro Power, 39 pages.
(Continued)

*Primary Examiner* — M Baye Diao
(74) *Attorney, Agent, or Firm* — Birch, Stewart, Kolasch & Birch, LLP

(57) ABSTRACT

A programmable battery source architecture includes: a battery module, including a plurality of battery units, and a programmable battery connection circuit coupled to the battery module. The programmable battery connection circuit includes: a matrix intersection line module, electrically coupled to the battery module for forming a plurality of battery connection configurations; a switch group, disposed at each line intersection of the matrix intersection line module, for switching the battery connection configurations; and a control unit, for dynamically controlling the switch group based on a load requirement, for selecting at least a battery connection configuration from the battery connection configurations, and accordingly, the battery module outputting at least an output voltage based on the selected at least a battery connection configuration.

13 Claims, 9 Drawing Sheets

(51) Int. Cl.
 *B60L 58/13* (2019.01)
 *B60L 58/16* (2019.01)
 *B60L 58/19* (2019.01)

(52) U.S. Cl.
 CPC ............ *B60L 58/19* (2019.02); *H02J 7/0063* (2013.01); *B60L 2240/545* (2013.01); *B60L 2240/547* (2013.01); *H02J 2007/0067* (2013.01); *Y02T 10/705* (2013.01); *Y02T 10/7005* (2013.01); *Y02T 10/7044* (2013.01); *Y02T 10/7055* (2013.01)

(58) Field of Classification Search
 CPC .. H02J 2007/0067; B60L 58/14; B60L 58/13; B60L 58/16; B60L 58/19; B60L 2240/545; B60L 2240/547; Y02T 10/7055; Y02T 10/7005; Y02T 10/7044; Y02T 10/705
 USPC ............. 320/128, 136, 116; 307/87; 429/62; 713/300
 See application file for complete search history.

(56) References Cited

U.S. PATENT DOCUMENTS

| | | | |
|---|---|---|---|
| 5,563,002 A | 10/1996 | Harshe | |
| 5,945,806 A | 8/1999 | Faulk | |
| 6,753,625 B2 | 6/2004 | Kelsey | |
| 7,075,194 B2 * | 7/2006 | Weidenheimer | F41B 6/00 180/65.1 |
| 7,893,561 B2 | 2/2011 | Weidenheimer et al. | |
| 8,330,419 B2 * | 12/2012 | Kim | H01M 10/4207 320/121 |
| 8,359,057 B2 | 1/2013 | Plestid | |
| 2006/0228622 A1 * | 10/2006 | Cohen | H01M 8/006 429/101 |
| 2009/0085553 A1 | 4/2009 | Kumar et al. | |
| 2011/0181245 A1 | 7/2011 | Wey et al. | |
| 2013/0320772 A1 * | 12/2013 | Qiao | H01M 10/04 307/87 |
| 2014/0117763 A1 | 5/2014 | Tiefenbach | |
| 2014/0157034 A1 | 6/2014 | Chiueh et al. | |
| 2014/0356656 A1 * | 12/2014 | Chen | H01M 10/441 429/62 |
| 2016/0134146 A1 * | 5/2016 | Ling | H01M 10/44 320/136 |

OTHER PUBLICATIONS

Kim et al., "Dependable, Efficient, Scalable Architecture for Management of Large-scale Batteries", IEEE Transactions on Industrial Informatics, vol. 8, Issue 2, Sep. 5, 2011, pp. 1-10.

Kim et al., "Networked Architecture for Hybrid Electrical Energy Storage Systems", DAC 2012, Jun. 3-7, 2012, pp. 522-528.

Kim et al., "On Dynamic Reconfiguration of a Large-Scale Battery System", Real-Time and Embedded Technology and Applications Symposium, 2009. RTAS 2009. 15th IEEE, Apr. 13-16, 2009, pp. 1-10.

Pedram et al., "Hybrid Electrical Energy Storage Systems", ISLPED'10, Aug. 18-20, 2010, 6 pages.

Urgaonkar et al., "Optimal Power Cost Management Using Stored Energy in Data Centers", SIGMETRICS'11, Jun. 7-11, 2011, 12 pages.

Wang et al., "Energy Storage in Datacenters: What, Where, and How much?", SIGMETRICS'12, Jun. 11-15, 2012, 12 pages.

Yue et al., "SIMES: A Simulator for Hybrid Electrical Energy Storage Systems", 2013 IEEE International Symposium on Low Power Electronics and Design (ISLPED), Sep. 4-6, 2013, 6 pages.

Taiwanese Notice of Allowance and Search Report for Taiwanese Application No. 103142540, dated Nov. 10, 2015.

* cited by examiner

PROGRAMMABLE BATTERY SOURCE ARCHITECTURE AND METHOD THEREOF

This application claims the benefit of Taiwan application Serial No. 103142540, filed Dec. 8, 2014, the subject matter of which is incorporated herein by reference.

TECHNICAL FIELD

The disclosure relates in general to a programmable battery source architecture and method thereof.

BACKGROUND

Due to emphasis of environment protection, the electric vehicles which are powered by electricity draw more attentions from car industries and consumers. The battery module of the electric vehicle includes a plurality of batteries. Thus, it is a great help for the car industries to develop a programmable battery source architecture which meets the load requirements, low cost and high battery usage efficiency.

SUMMARY

The disclosure is directed to a programmable battery source architecture and method thereof, which forms an (array) battery connection configuration by coupling a matrix intersection line module with a battery module, for outputting one or more output voltages/currents at the same time.

According to one embodiment, a programmable battery architecture is provided. The programmable battery source architecture includes: a battery module, including a plurality of battery units, and a programmable battery connection circuit coupled to the battery module. The programmable battery connection circuit includes: a matrix intersection line module, electrically coupled to the battery module, and forming a plurality of battery connection configurations; a switch group, disposed at each line intersection of the matrix intersection line module, and switching the battery connection configurations; and a control unit, for dynamically controlling the switch group based on a load requirement, and selecting at least a battery connection configuration from the battery connection configurations, and accordingly, the battery module outputting at least an output voltage based on the selected at least a battery connection configuration.

According to another embodiment, a programmable battery source method is provided. A first battery unit group is selected among a plurality of battery units. Each battery unit of the first battery unit group is connected in parallel, and respective dynamic battery characteristic parameters of each battery unit of the first battery unit group are continuously detected. Whether a first parallel voltage and a first parallel current of the first battery unit group satisfy a load voltage and a load current, respectively, is judged. If it is judged that the first parallel voltage and the first parallel current of the first battery unit group satisfy the load voltage and the load current, a matrix intersection line module and the first battery unit group are coupled to form a first battery connection configuration, for the first battery unit group to output at least an output voltage.

Figure 1:
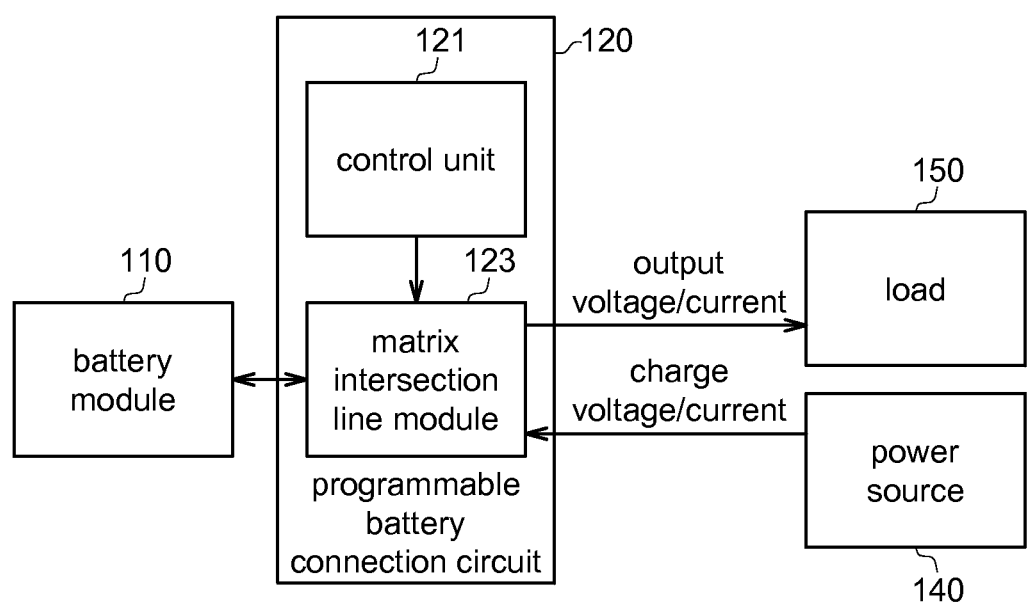
FIG. 1 shows a programmable battery source architecture according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Now refer to FIG. 1 which shows a programmable battery source architecture 100 according to an embodiment of the disclosure. As shown in FIG. 1, the programmable battery source architecture 100 includes a battery module 110 and a programmable battery connection circuit 120. The programmable battery connection circuit 120 includes a control unit 121, a switch group (not shown) and a matrix intersection line module 123.

The battery module 110 includes a plurality of battery units. In the following, the term "battery unit" refers to a single battery or a serial/parallel combination of several batteries. In an embodiment of the application, the battery module 110 has a function for measuring its own battery parameters (for example, a voltage, a current, a temperature and an internal impedance), or, the programmable battery connection circuit 120 may measure the battery parameters of the battery module 110.

The programmable battery connection circuit 120 provides electrical coupling between the batteries of the battery module 110, electrical coupling between the battery module 110 and a power source 140 and electrical coupling between the battery module 110 and a load 150. The battery module 110 and the programmable battery connection circuit 120 may form a plurality of battery connection configurations. The control unit 121 may dynamically control ON/OFF of the switch group based on a load requirement, to select at least one among the battery connection configurations, and accordingly the battery module 110 outputs battery power to the load 150.

The switch group is deposited at each line intersection of the matrix intersection line module 123 and is controlled by the control unit 121. The switch group switches the battery connection configurations.

The matrix intersection line module 123 includes a matrix intersection input line unit, a matrix intersection output line unit and a matrix intersection battery connection unit. The matrix intersection input line unit provides a charge line connection via which the source 140 charges the battery module 110. The matrix intersection output line unit provides a line connection between the output voltage of the battery module and the load 150. The matrix intersection battery connection unit provides a line connection between the battery units of the battery module 110.

By controlling the programmable battery connection circuit 120, the batteries units of the battery module 110 may be connected in serial or parallel, or some of the battery units may be in a bypass status. The bypass status refers to that neither positive terminal nor the negative terminal of the battery unit is connected.

Figure 2A:
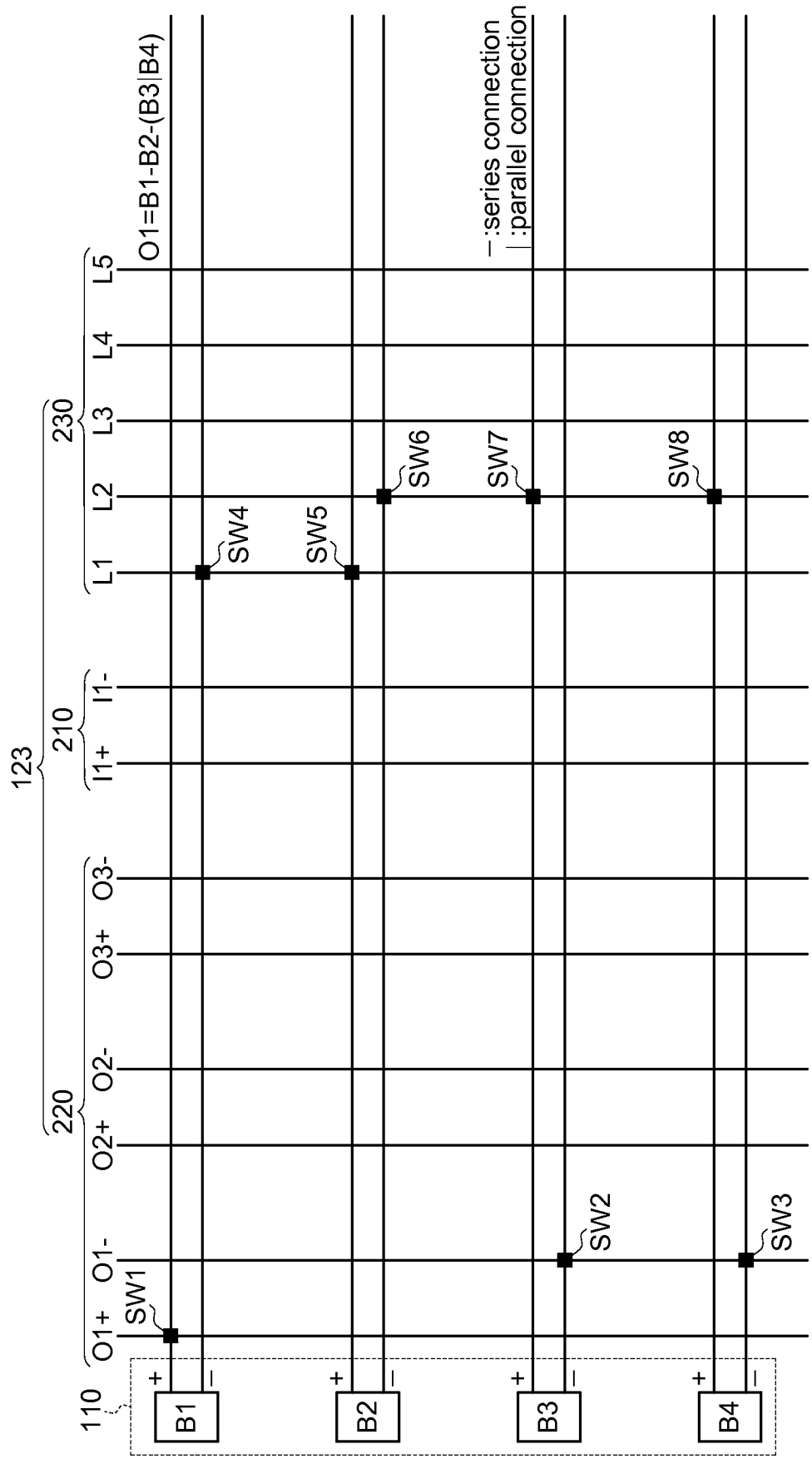
FIG. 2A-2C show examples of a programmable battery connection circuit according to an embodiment of the disclosure.
Figure 2B:
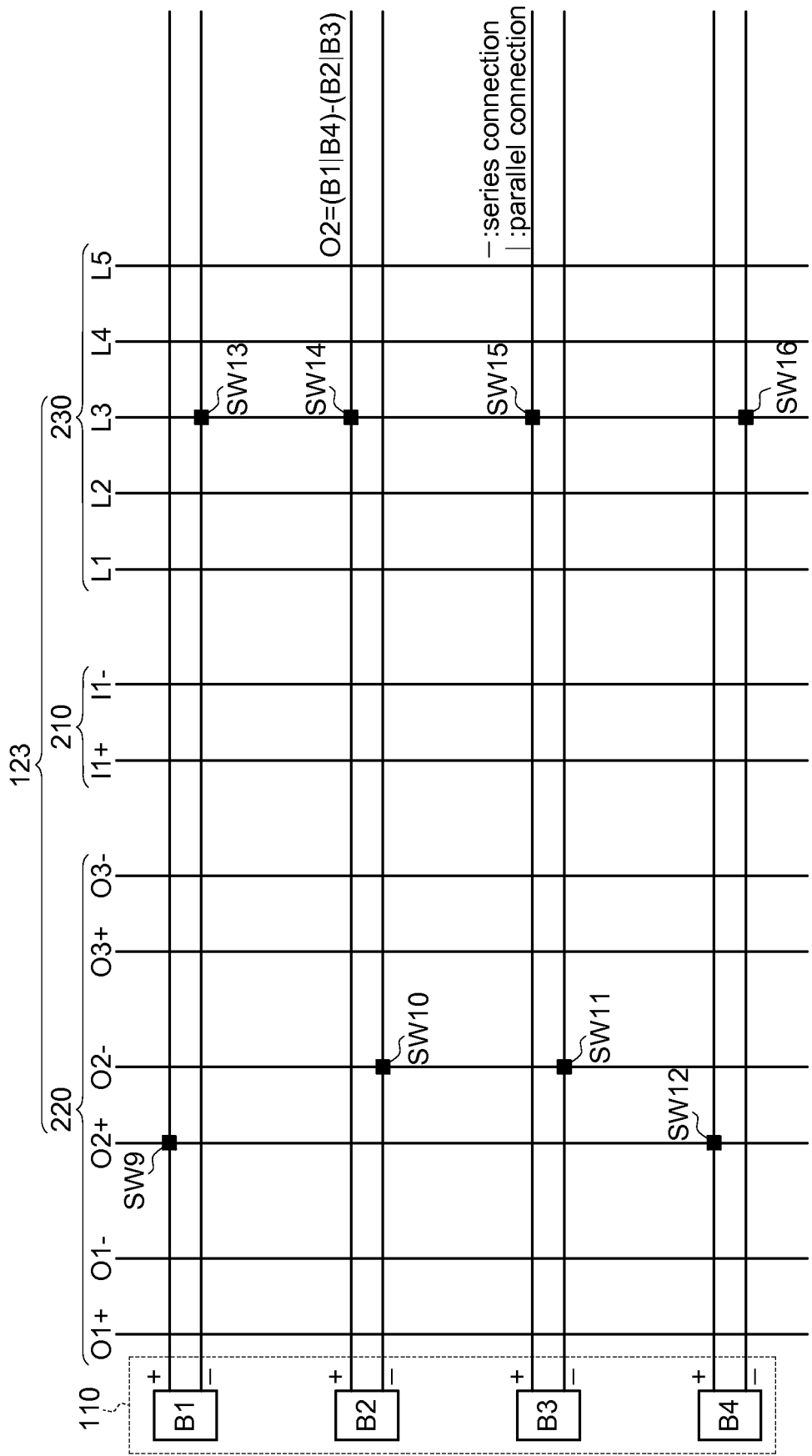
Figure 2C:
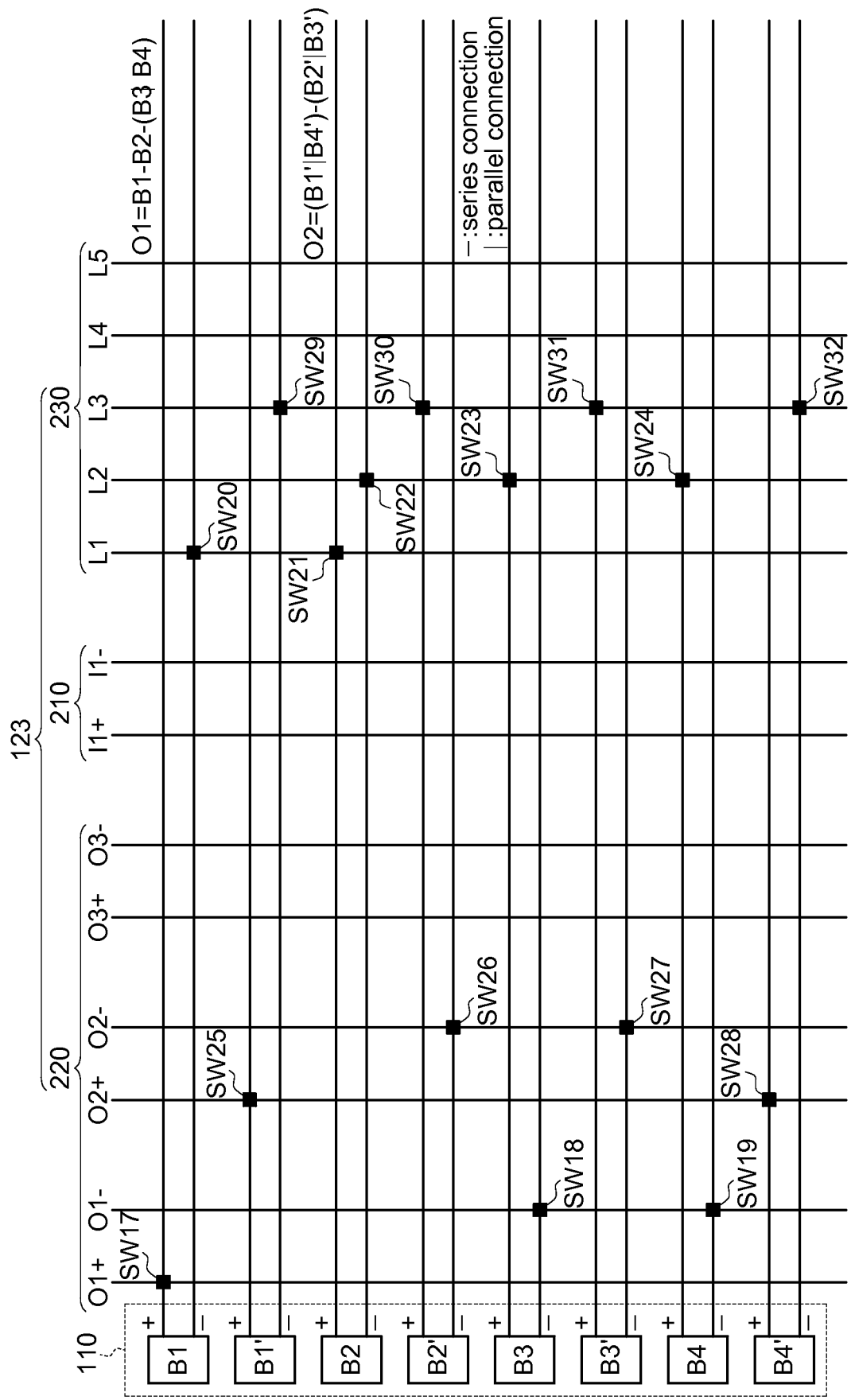

FIG. 2A-2C show examples of a programmable battery connection circuit according to an embodiment of the disclosure. The matrix intersection line module 123 includes the matrix intersection input line unit 210, the matrix intersection output line unit 220 and the matrix intersection battery connection unit 230.

The matrix intersection input line unit 210 of the matrix intersection line module 123 includes a plurality of input lines. Here, the matrix intersection input line unit 210 including input lines I1+ and I1− is taken as an example. The disclosure is not limited by. The input lines I1+ and I1− and the positive/negative terminals of the battery units B1-B4 form matrix intersections. Further, a respective switch (of the switch group) is deposited at each line intersection of the input lines I1+ to I1− and the positive/negative terminals of the battery units B1-B4. The initial status of the switches is in OFF status. For example, if a battery unit B1 is to be charged, then the control unit 121 controls the switches deposited at the intersections of the input lines I1+/I1− and the positive/negative terminals of the battery unit B1 to be turned ON, and thus, the charge current from the power source 140 may charge the battery unit B1 via the input lines I1+/I1−.

The matrix intersection output line unit 220 of the matrix intersection line module 123 includes a plurality of output lines. Here, the matrix intersection output line unit 220 including output lines O1+ to O3− is taken as an example. The disclosure is not limited by. The output lines O1+ to O3− and the positive/negative terminals of the battery units B1-B4 form matrix intersections. Further, a respective switch (of the switch group) is deposited at each line intersection of the output lines O1+ to O3− and the positive/negative terminals of the battery units B1-B4. The initial status of the switches is in OFF status. For example, if the control unit 121 decides/configures that the battery unit B1 is to provide battery power, then the control unit 121 controls the switches deposited at the intersections of the output lines (for example, O1+/O1−) and the positive/negative terminals of the battery unit B1 to be turned ON, and thus, the battery power from the battery unit B1 may be provided to the load 150 via the output lines O1+/O1−.

The matrix intersection battery connection unit 230 of the matrix intersection line module 123 includes a plurality of intermediate lines. Here, the matrix intersection battery connection unit 230 including intermediate lines L1 to L5 is taken as an example. The disclosure is not limited by. The intermediate lines L1 to L5 and the positive/negative terminals of the battery units B1-B4 form matrix intersections. Further, a respective switch (of the switch group) is deposited at each line intersection of the intermediate lines L1 to L5 and the positive/negative terminals of the battery units B1-B4. The initial status of the switches is in OFF status. For example, if the control unit 121 decides/configures that the battery units are connected in series/parallel, then the control unit 121 controls the corresponding switches to be turned ON.

As shown in an embodiment of FIG. 2A, if the load voltage is O1=B1-B2−(B3|B4), wherein the symbols "−" and "|" refer to a series connection and a parallel connection, respectively. The connection/combination "B1-B2−(B3|B4)" is the battery connection configuration in the embodiments of the disclosure.

An example of connection of the matrix intersection input line unit 210, the matrix intersection output line unit 220 and the matrix intersection battery connection unit 230, which are controlled by the control unit 121, is shown in FIG. 2A. In order to connect the battery units B3 and B4 in parallel, the control unit 121 controls a switch SW7 (which is deposited on a line intersection of the intermediate line L2 of the matrix intersection battery connection unit 230 and the positive terminal of the battery unit B3) and a switch SW8 (which is deposited on a line intersection of the intermediate line L2 of the matrix intersection battery connection unit 230 and the positive terminal of the battery unit B4) to be turned ON. Thus, the positive terminals of the battery units B3 and B4 are connected. Besides, the control unit 121 controls a switch SW2 (which is deposited on a line intersection of the output line O1− of the matrix intersection output line unit 220 and the negative terminal of the battery unit B3) and a switch SW3 (which is deposited on a line intersection of the output line O1− of the matrix intersection output line unit 220 and the negative terminal of the battery unit B4) to be turned ON. Thus, the negative terminals of the battery units B3 and B4 are connected. By switch controlling, the battery units B3 and B4 are connected in parallel.

In order to connect the battery units B1 and B2 in series, similarly, the control unit 121 controls a switch SW4 (which is deposited on a line intersection of the intermediate line L1 of the matrix intersection battery connection unit 230 and the negative terminal of the battery unit B1) and a switch SW5 (which is deposited on a line intersection of the intermediate line L1 of the matrix intersection battery connection unit 230 and the positive terminal of the battery unit B2) to be turned ON. Thus, the negative terminal of the battery unit B1 is connected to the positive terminal of the battery unit B2. By switch controlling, the battery units B1 and B2 are connected in series.

In order to connect the battery unit combination (B1-B2) in series with the battery unit combination (B3|B4), similarly, the control unit 121 controls a switch SW6 (which is deposited on a line intersection of the intermediate line L2 of the matrix intersection battery connection unit 230 and the negative terminal of the battery unit B2) to be turned ON. Thus, the negative terminal of the battery unit B2 is connected to the positive terminals of the battery units B3 and B4. By switch controlling, the battery unit combination (B1-B2) is in series connection with the battery unit combination (B3|B4).

The battery power is output from the output voltage O1 and thus the control unit 121 controls a switch SW1 (which is deposited on a line intersection of the output line O1+ and the positive terminal of the battery unit B1) and the switches SW2-SW3 to be turned ON. Thus, the battery unit combination (or said, the battery connection configuration) "B1-B2-(B3|B4)" provides battery power via the output lines O1+ and O1-.

As shown in the embodiment of FIG. 2A, the control unit 121 of an embodiment of the disclosure may control or configure the ON/OFF status of the switches SW1-SW8 to connect the battery units B1-B4 in series/parallel for providing the desired output voltage/current.

Similarly, as shown in FIG. 2B, if the desired output voltage O2=(B1|B4)-(B2|B3), the control unit 121 controls switches SW9-SW16 to be turned ON. By this, the battery unit B1 is connected in parallel with the battery unit B4; the battery unit B2 is connected in parallel with the battery unit B3; and the battery unit combination (B1|B4) is connected in series with the battery unit combination (B2|B3). Thus, the desired output voltage O2=(B1|B4)-(B2|B3) is generated.

FIGS. 2A and 2B show that one output voltage (O1 or O2) is output at the same time. In another embodiment of the disclosure, two or more output voltages may be output at the same time, as shown in FIG. 2C.

In FIG. 2C, the battery units B1 and B1' have the same or very close battery parameters; the battery units B2 and B2' have the same or very close battery parameters; the battery units B3 and B3' have the same or very close battery parameters; and the battery units B4 and B4' have the same or very close battery parameters. As shown in FIG. 2C, in order to output two output voltages O1 and O2 at the same time, the control unit 121 controls switches SW17-SW32 to be turned ON. The details are similar to the above description and thus are omitted here.

Further, in an embodiment of the disclosure, by dynamically controlling the coupling relationship between the matrix intersection line module 123 and the battery module 110, the programmable battery source architecture 100 may output two or more output voltages to the load 150 at the same time, which is still within the spirit and the scope of the disclosure.

In other possible embodiments of the disclosure, the matrix intersection output line unit 220 may selectively include a voltage converter (for example, a DC (direct current) to DC converter) to perform a precise voltage conversion on the output voltage from the battery module 110.

In other possible embodiments of the disclosure, in switching the battery connection configuration (for example, switching from the battery connection configuration in FIG. 2A into the battery connection configuration in FIG. 2B), a low-loss constant current switching technology may be applied, to limit the power loss during switching within a permissible range. Further, in normal operation of the programmable battery source architecture 100, the control unit 121 may switch the battery connection configuration in real-time or on-line.

In an embodiment of the disclosure, how to select suitable battery units among the battery module 110 and how to decide the series/parallel connection of the selected battery units are described.

Based on the load requirement (the output voltage and the output current), the control unit 121 determines/switches the battery connection configuration which meets the load requirement. In an embodiment of the disclosure, the dynamic battery characteristic curve (BCC) of each battery unit may be detected in real time, and the BCC may be derived from the battery parameters: voltage, current, temperature and/or the internal impedance. Based on BCC, the embodiment of the disclosure may output the desired output current and output power.

In one embodiment, BCC refers to a battery voltage versus discharge capacity (V-Ah (ampere-hour)) characteristic curve, or a battery current versus discharge capacity (I-Ah) characteristic curve, or a battery output power versus discharge capacity (P-Ah) characteristic curve.

Figure 3A:
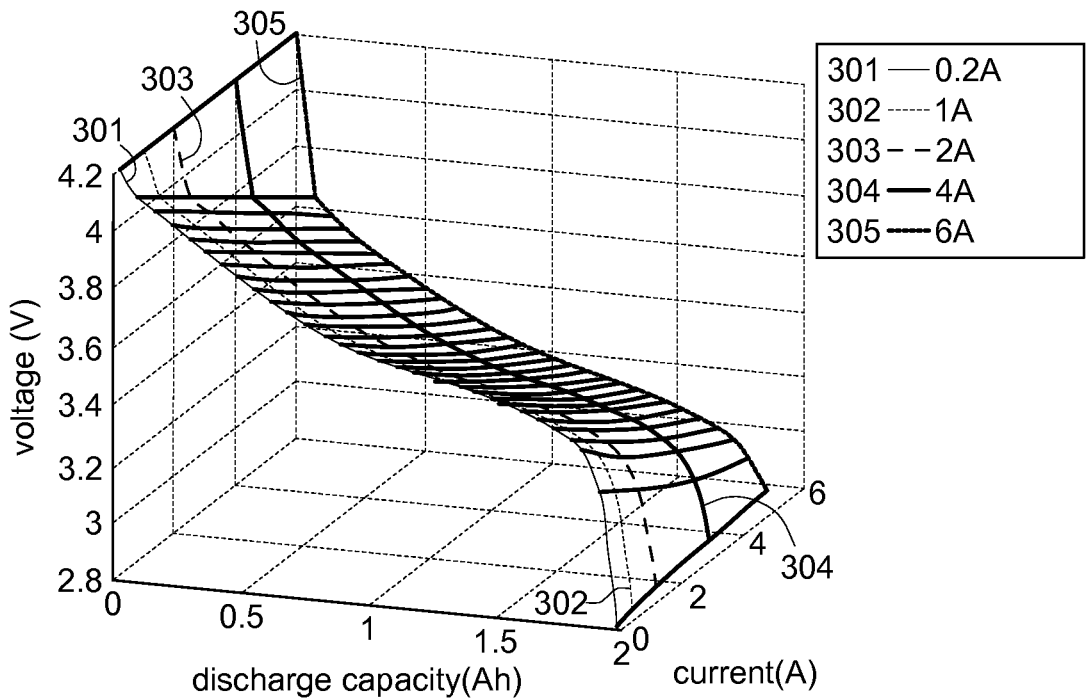
FIGS. 3A and 3B show battery discharge curve models each having a plurality of different discharge curves.
Figure 3B:
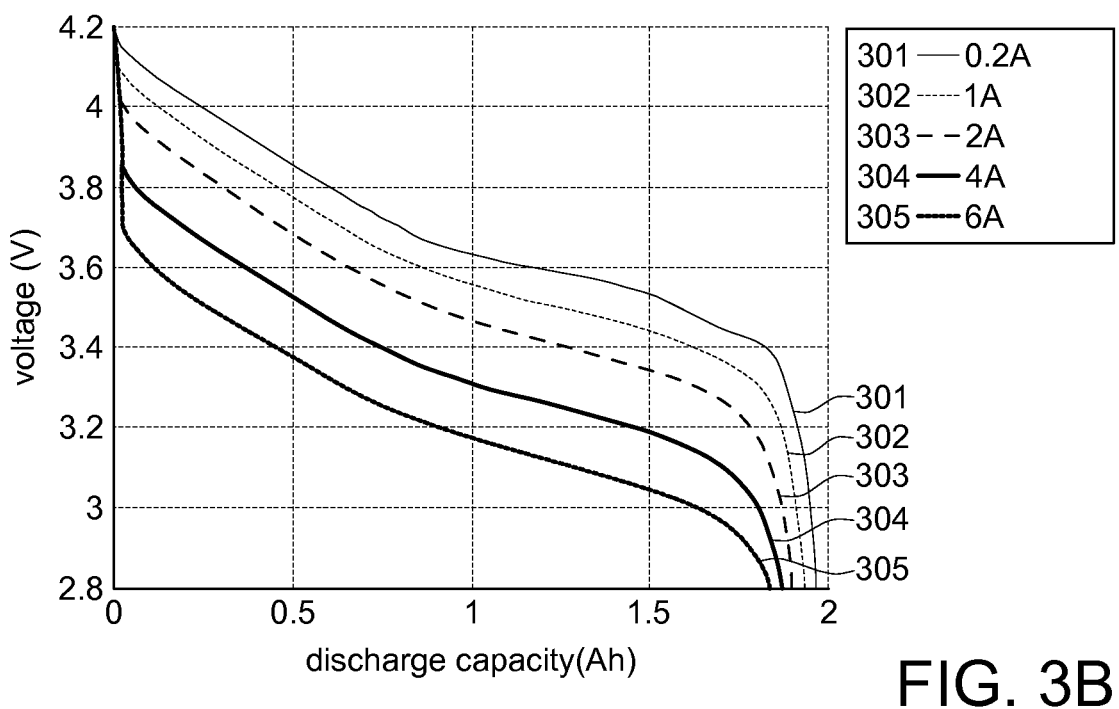

FIGS. 3A and 3B show battery discharge curve models having a plurality of different discharge curves. As shown in FIGS. 3A and 3B, the five V-I-Ah curves represent five different discharge currents: 0.2 A (the curve 301), 1 A (the curve 302), 2 A (the curve 303), 4 A (the curve 304) and 6 A (the curve 305).

In an embodiment of the disclosure, the control unit 121 may obtain the BCC of each battery unit in real time. In determining the battery connection configuration, the control unit 121 may select several low-current battery units to form the battery connection configuration, rather than a single high-current battery unit to form the battery connection configuration. That is to say, the low-current battery unit has higher selection priority than the high-current battery unit. For example, if the required output current is 1 A, there are three battery units A to C satisfying the selection criteria: the battery unit A which outputs the current 1 A, the battery unit B which outputs the current 0.8 A, and the battery unit C which outputs the current 0.7 A. The control unit 121 may select the battery units B and C to be parallel connected for providing the desired output current than selecting the battery unit A alone for providing the desired output current because the battery loss is less if the battery units B and C are selected. That is because, if the battery outputs a high current, then the damage to the battery is higher. Thus, in the application, the priority of the low-current battery unit is higher than the high-current battery unit.

An embodiment of the disclosure dynamically shows battery electrochemical stress curve by AOW (aging-adaptive operation window), to limit the battery unit to be operated in 10%-90% of the operation window. Thus, the electrochemical stress may be lowered and the battery life is lengthened.

In details, in an embodiment of the disclosure, a stress index (an AOW index, or a discharge stress index) during the battery discharge operation is determined. Based on this, the embodiment may select among the battery units which may be operated in the AOW low stress operation region, for lengthening the battery life.

Figure 4:
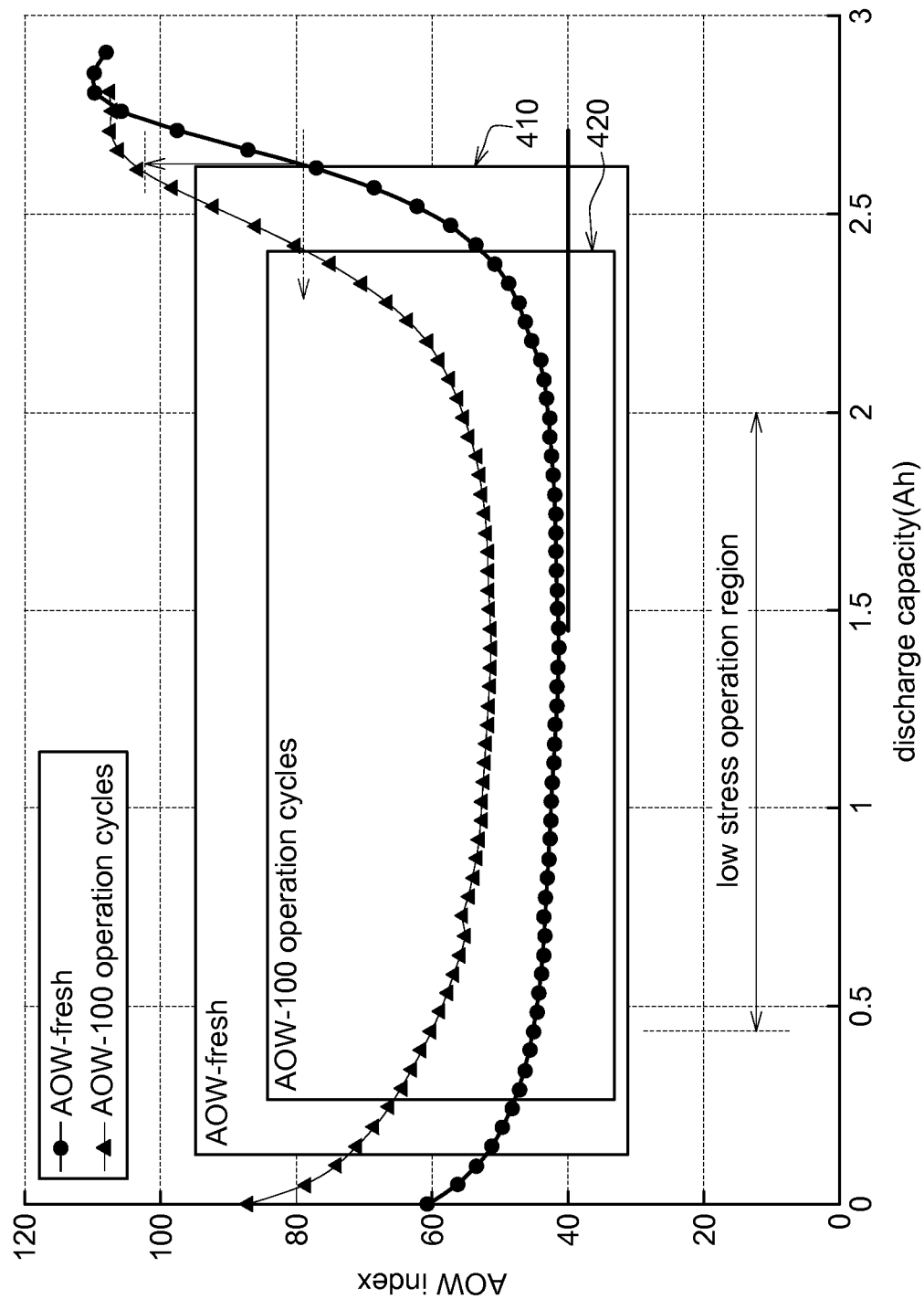
FIG. 4 shows respective AOW diagrams of a fresh battery and a battery after 100 operation cycles.

FIG. 4 shows respective AOW diagrams of a fresh battery and a battery after 100 operation cycles. The block 410 represents a low stress operation region of the fresh battery, wherein the AOW index=80 is related to the discharge capacity=2.64 Ah. The block 420 represents a low stress operation region of the battery which is operated for 100 cycles, wherein the AOW index=80 is related to the discharge capacity=2.4 Ah. That is, along with the operation times on the battery is more (i.e. the battery is aged), the discharge capacity related to the AOW index=80 is lowered. An embodiment of the disclosure determines a low stress operation region of each battery based on the AOW index, so that the battery is operated in the low stress operation region for lengthening the battery life.

Besides, in an embodiment of the disclosure, if it is to select among two battery units which are both operated in the low stress operation region, the battery unit having a higher battery capacity is preferred than the battery unit having a lower battery capacity. The high-capacity battery unit has a higher selection priority than the low-capacity battery unit.

Besides, in selecting/determining the battery connection configuration, the number of the series connection of the battery units is as low as possible, for reducing power conversion loss. That is, in selecting the battery units among the battery module 110, the high voltage battery is preferred than the low voltage battery.

Further, in determining the battery connection configuration, if several battery units are to be connected in parallel, then the control unit 121 selects the battery units having close output voltages for parallel connection, for preventing a severe charge balance effect. In view of AOW, it is better to prevent the selected battery unit from being operated in the high stress operation region. That is, if a battery unit is possible to be operated in the high stress operation region, then the battery unit will not be selected.

In brief, in an embodiment of the disclosure, the discharge capacity of the battery units is detected based on the battery characteristic curve (BCC) (as shown in FIGS. 3A and 3B). The BCC is used to determine the related AOW index. Based on the AOW index, whether the battery unit is operated in the low stress operation region is judged. For example, as shown in FIG. 4, if the discharge capacity of the fresh battery unit is 1.5 Ah based on the measurement result of the BCC, then the current AOW index of the fresh battery unit will be about 40, based on the BCC. Thus, the fresh battery unit is operated in the low stress operation region.

In another situation, if the discharge capacity of the battery unit which is operated for 100 cycles is 2.5 Ah based on the measurement result of the BCC, then the current AOW index of the battery unit which is operated for 100 cycles will be about 90, which is higher than the AOW index threshold (80). Thus, the battery unit which is operated for 100 cycles is operated in the high stress operation region. The embodiments of the disclosure will avoid selecting the battery units which are supposed to be operated in the high stress operation region.

In an embodiment of the application, the dynamic battery characteristic parameters of the battery units are detected to obtain the dynamic battery characteristic curves. The BCC of the battery units are used to judge whether the battery units are operated in the low stress operation region (for example, by the AOW index).

Besides, in an embodiment of the application, when the control unit 121 decides/configures the battery connection configuration, the energy loss due to the transitions of the switches is temporarily not in consideration.

An embodiment of the application, a performance window is introduced to determine whether the status of each battery unit meets the requirements. The performance window includes the following parameters: V (the battery voltage), C (the battery current), T (the battery temperature), R (the battery internal resistance) and P (the permissible current range, PCR). The parameters V, C, T and R may be obtained via measuring the battery units by the battery module 110 and/or the programmable battery connection circuit 120. The permissible current range (PCR) refers to a permissible output current range for the battery unit (PCR including an upper limit and a lower limit). In an embodiment of the application, the detected dynamic battery characteristic parameters/curves (for example, BCC) may be used to dynamically update the upper limit of the PCR. If the control unit 121 determines that a battery unit is used to form the battery connection configuration, then the control unit 121 determines that whether the current provided by the battery unit is within PCR. If yes, then the control unit 121 will select the battery unit to form the battery connection configuration; and if not, then the control unit 121 will not select the battery unit to form the battery connection configuration.

The temperature of the battery unit in the usage status must be lower than a temperature threshold. The control unit 121 continuously detects whether the temperature of each battery unit is lower than the temperature threshold. If the temperature of any one of the battery units is higher than the temperature threshold, then the control unit 121 makes a warning.

The battery capacity of the battery unit in the usage status must be higher than a battery capacity threshold. The control unit 121 continuously detects whether the battery capacity of each battery unit is higher than the battery capacity threshold. If the battery capacity of any one of the battery units is lower than the battery capacity threshold, then the control unit 121 makes a warning.

The battery voltage of the battery unit in the usage status must be higher than a discharge cutoff voltage. That is because, the battery unit which has a battery voltage lower than the discharge cutoff voltage will be damaged/failed if the battery unit continuously discharges (i.e. provides power). The control unit 121 continuously detects whether the battery voltage of each battery unit is higher than the discharge cutoff voltage. If the battery voltage of any one of the battery units is lower than the discharge cutoff voltage, then the control unit 121 makes a warning.

Figure 5:
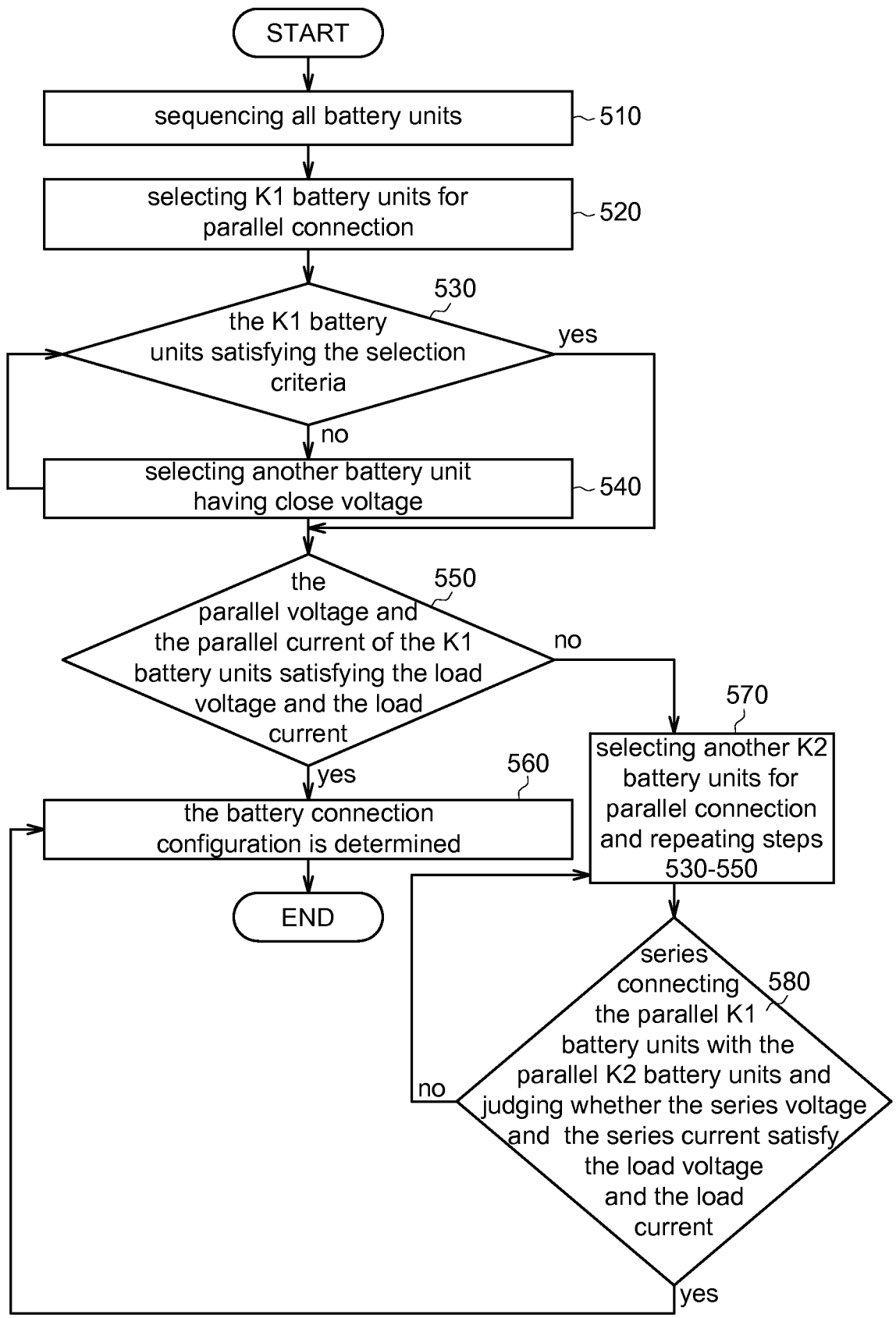
FIG. 5 shows a flow chart for determining a battery connection configuration according to an embodiment of the disclosure.

FIG. 5 shows a flow chart for determining a battery connection configuration according to an embodiment of the disclosure. All battery units are sequenced in a list based on the respective battery parameters (for example, the battery voltage), as shown in step 510. In an embodiment of the application, the step 510 is optional.

Then, in the first selection round, K1 battery units (or said, a battery unit group) are selected among the battery units for parallel connection. The parallel voltage of the K1 battery units is U1, as shown in step 520. The voltages of the K1 battery units are as close to each other as possible, for preventing a severe charge balance effect. The total parallel current of the K1 battery units must be higher than a load current. The control unit 121 continuous detects the dynamic battery characteristic parameters of the K1 battery units to determine that the parameters V (the battery voltage), C (the battery current), T (the battery temperature), R (the battery internal resistance) and P (PCR) of each of the K1 battery units are permissible or not. Besides, the control unit 121 continuously detects the respective AOW index of each of the K1 battery units to determine whether each of the K1 battery units is operated in the low stress operation region. That is, the control unit 121 continuously determines whether the K1 battery units meet the selection criteria (whether the voltage, the current, the temperature and the battery capacity meet the requirements), as shown in step 530. That is, in the first several selection rounds, the battery units which have higher battery voltage will have higher selection priority.

Besides, after the K1 battery units are parallel and the voltages of the K1 battery units are balanced, the control unit 121 still continuously detects whether the respective currents of the parallel K1 battery units are within the PCR, as shown in step 530. If the current of one battery unit (after voltage balance) in the K1 battery units exceeds the PCR, then the control unit 121 skips (i.e. unselects) the battery unit and selects from the list another battery unit which has closer voltage (step 540) to replace the battery unit whose current exceeds the PCR. Steps 530 and 540 are repeated until the respective current of each of the K1 battery units after voltage balance meets the PCR.

Then, the control unit 121 judges whether the parallel voltage and the parallel current of the K1 battery units satisfy the load voltage and the load current, as shown in step 550. If yes in step 550, then the battery connection configuration is determined (step 560) and the switch group and the matrix intersection line module 123 are controlled based on the battery connection configuration. Thus, the parallel connection of the K1 battery units meets the load voltage/current requirements. If no in step 550, then the control unit 121 selects other K2 battery units from the remaining battery units, excluding the K1 battery units, (the K2 battery units also have to satisfy the above selection criteria) and the K2 battery units are parallel connected. Steps 530-550 are repeated, as shown in step 570. Then, the control unit 121 series connects the parallel K1 battery units with the parallel K2 battery units (the parallel K2 battery units are called a second battery group), and determines whether the series voltage and the series current satisfy the load voltage and the load current, as shown in step 580. If no in step 580, then the step 570 is repeated to find K3 battery units (i.e. the third battery group), K4 battery units (i.e. the fourth battery group) . . . until the total series voltage and the total series current satisfy the load voltage and the load current. If yes in the step 580, then the battery connection configuration is determined; and as described in the embodiment of the disclosure, the matrix intersection line module 123, the first battery unit group and the second battery unit group are coupled to form the battery connection configuration, for the first battery unit group and the second battery unit group to output the voltage and the current.

After the K1 battery units, the K2 battery units and so on are series connected, the control unit 121 determines whether the total series voltage is higher than the load voltage and continuously detects the respective dynamic battery characteristic parameters of each battery unit of the series connected K1 battery units and the K2 battery units. The control unit 121 continuously detects whether the respective current of each of the battery units is within its PCR. If the current is still within the PCR, then the control unit 121 determines that the battery connection configuration which meets the load voltage/current is found. Besides, the control unit 121 continuously detects: whether the respective voltage of the battery units is higher than the discharge cutoff voltage, whether the respective temperature of the battery units is lower than the temperature threshold, and whether the respective battery capacity of the battery units is lower than the battery capacity threshold.

Figure 6:
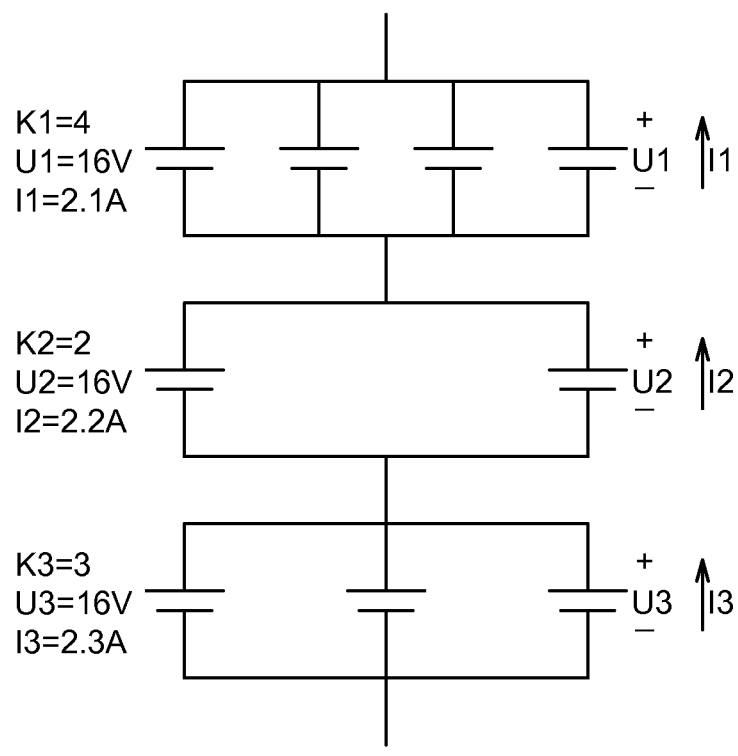
FIG. 6 shows an example of the battery connection configuration according to an embodiment of the disclosure.

FIG. 6 shows an example of the battery connection configuration according to an embodiment of the disclosure. It is supposed that the desired load voltage is 48V and the desired load current is 2 A. In the first selection round, the control unit 121 finds K1=4 battery units for parallel connection (wherein the parallel voltage U1=16V, the parallel current I1=2.1 A, and each battery unit providing a current equal to 2.1/4=0.525 A which is within the PCR); in the second selection round, the control unit 121 finds K2=2 battery units for parallel connection (wherein the parallel voltage U2=16V, the parallel current I2=2.2 A, and each battery unit provides a current equal to 2.2/2=1.1 A which is within the PCR); and in the third selection round, the control unit 121 finds K3=3 battery units for parallel connection (wherein the parallel voltage U3=16V, the parallel current I3=2.3 A, and each battery unit provides a current equal to 2.3/3=0.7667 A which is within the PCR). The total voltage and the total current after the K1-K3 battery units are parallel/series connected are 48V and 2.1 A, which meet the load voltage (48V) and the load current (2 A). Further, the control unit 121 judges that after parallel/series connection, the current of each battery unit meets respective PCR or not.

How to connect the battery in parallel/series may be referred to FIG. 2A-2C and thus the details are not repeated here.

Figure 7:
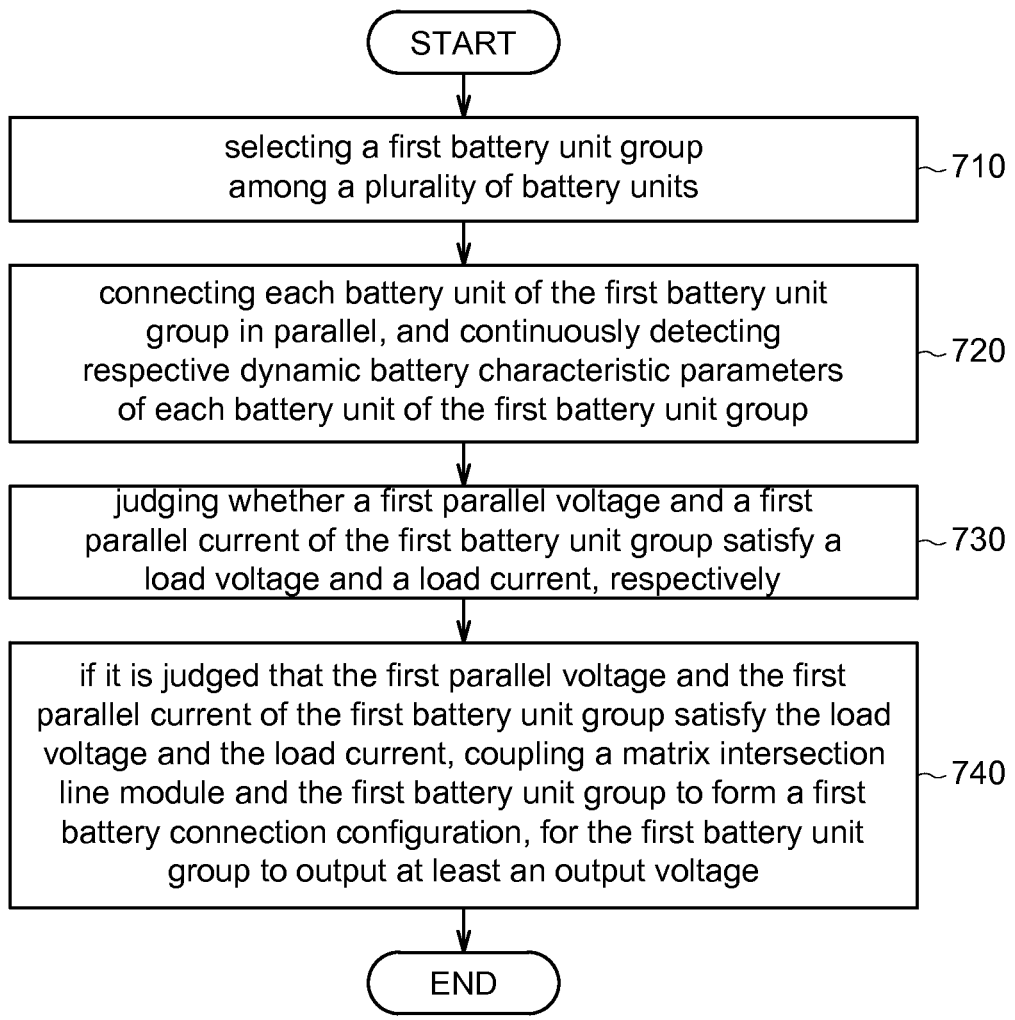
FIG. 7 shows a flow chart for selecting a programmable battery source method according to an embodiment of the disclosure.

FIG. 7 shows a flow chart for selecting a programmable battery source method according to an embodiment of the disclosure. As shown in FIG. 7, in step 710, the first battery unit group is selected among a plurality of battery units. In step 720, each battery unit of the first battery unit group is connected in parallel, and respective dynamic battery characteristic parameters of each battery unit of the first battery unit group are continuously detected. In step 730, whether the first parallel voltage and the first parallel current of the first battery unit group satisfy a load voltage and a load current, respectively, is judged. In step 740, if it is judged that the first parallel voltage and the first parallel current of the first battery unit group satisfy the load voltage and the load current, a matrix intersection line module and the first battery unit group are coupled to form the first battery connection configuration, for the first battery unit group to output at least an output voltage. Details of the step 710-740 are similar to the above description and thus are not repeated.

The electric vehicles have a high requirement on batteries (that is, it is better to equip the high quality batteries on the electrical vehicles). Further, at the current technology, the batteries having battery capacity lower than 60% will be weeded out and cannot be used in the electric vehicles. However, in case that the embodiments of the application are applied on the electric vehicles, even if the batteries do not have high quality (for example, the regular batteries used in 3 C products), the middle quality batteries or the batteries having battery capacity lower than 60% may be used in the electric vehicles. That is because the embodiments of the application may change the battery connection configurations dynamically or on-line, for selecting suitable battery units among the battery module. Thus, the embodiments of the application may be used to solve the high cost issue of the electric vehicles.

Further, in the electric vehicle structure, a fixed-frame battery system is used and thus the battery units cannot be on-line rotated which leads to the rapid aging of the battery units. On the contrary, in the embodiments of the application, because the battery connection configuration may be dynamically adjusted and the battery units of the battery module may on-line rotated, the aging of the battery units may be postponed.

Still further, because in the embodiments of the application, the battery connection configuration may be dynamically adjusted or determined. Thus, even if the batteries do not have the same consistency, the usage efficiency of the batteries may be maximum.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A programmable battery source architecture, including:
   a battery module, including a plurality of battery units, and a programmable battery connection circuit coupled to the battery module, the programmable battery connection circuit including:
  a matrix intersection line module, electrically coupled to the battery module, forming a plurality of battery connection configurations;
  a switch group, disposed at each line intersection of the matrix intersection line module, switching the battery connection configurations; and
a control unit, dynamically controlling the switch group based on a load requirement, selecting at least a battery connection configuration from the battery connection configurations, and accordingly, the battery module outputting at least an output voltage based on the selected at least a battery connection configuration,
wherein the control unit selects a first battery unit group among the plurality of battery units based on respective close output voltages and respective discharge stress indexes of the plurality of battery units having lower output currents and discharge capacities between 10%-85% of total discharge capacity in a low stress operation region, wherein the control unit continuously detects whether the respective output currents of the battery units group are within a permissible current range, and the battery units having lower output currents has higher selection priority than the battery units having higher output currents, wherein the control unit connects each battery unit of the first battery unit group in parallel and judges whether a first parallel voltage and a first parallel current of the first battery unit group satisfy a load voltage and a load current, respectively,
if it is judged that the first parallel voltage and the first parallel current of the first battery unit group satisfy the load voltage and the load current, a matrix intersection line module and the first battery unit group are coupled to form a first battery connection configuration, for the first battery unit group to output the at least an output voltage,
if it is judged that at least one of the first parallel voltage and the first parallel current of the first battery unit group fails to satisfy the load voltage and the load current, the control unit selects a second battery unit group among the battery units based on respective close output voltages and respective discharge stress indexes of the plurality of battery units, connects each battery unit of the second battery unit group in parallel, and judges whether a series voltage and a series current of a series connection of the first battery unit group and the second battery unit group satisfy the load voltage and the load current,
if it is judged that the series voltage and the series current of the series connection of the first battery unit group and the second battery unit group satisfy the load voltage and the load current, the matrix intersection line module, the first battery unit group and the second battery unit group are coupled to form a second battery connection configuration, for the first battery unit group and the second battery unit group outputting the at least the output voltage.

2. The programmable battery source architecture according to claim 1, wherein the matrix intersection line module includes:
  a matrix intersection input line unit, controlled by the control unit to provide electric coupling between the battery module and a power source; a matrix intersection output line unit, controlled by the control unit to provide electric coupling between the battery module and a load; and
  a matrix intersection battery connection unit, controlled by the control unit to provide electric coupling between the battery units of the battery module.

3. The programmable battery source architecture according to claim 1, wherein in normal operation status of the programmable battery source architecture, the control unit switches the battery connection configurations real-time/on-line.

4. The programmable battery source architecture according to claim 1, wherein the control unit further selects among the battery units to form the battery connection configurations based on respective dynamic battery characteristic parameters of the battery units of the battery module.

5. The programmable battery source architecture according to claim 1, wherein the control unit dynamically controls the switch group and thus the battery module outputs at least two output voltages at the same time based on the selected at least a battery connection configuration.

6. The programmable battery source architecture according to claim 1, wherein when the control unit selects among the battery units, if a first battery unit has a first output current lower than a second output current of a second battery unit, then the select unit selects the first battery unit to form the battery connection configurations.

7. The programmable battery source architecture according to claim 1, wherein when the control unit selects among the battery units, if a first battery unit has a first battery capacity higher than a second battery capacity of a second battery unit, then the select unit selects the first battery unit to form the battery connection configurations.

8. A programmable battery source method, including:
  selecting a first battery unit group among a plurality of battery units based on respective close output voltages and respective discharge stress indexes of the battery units having lower output currents and discharge capacities between 10%-85% of total discharge capacity in a low stress operation region, wherein the control unit continuously detects whether the respective output currents of the battery units group are within a permissible current range, wherein the battery units having lower output currents has higher selection priority than the battery units having higher output currents;
  connecting each battery unit of the first battery unit group in parallel, and continuously detecting respective dynamic battery characteristic parameters of each battery unit of the first battery unit group;
  judging whether a first parallel voltage and a first parallel current of the first battery unit group satisfy a load voltage and a load current, respectively; and
  if it is judged that the first parallel voltage and the first parallel current of the first battery unit group satisfy the load voltage and the load current, coupling a matrix intersection line module and the first battery unit group to form a first battery connection configuration, for the first battery unit group to output at least an output voltage,
  if it is judged that at least one of the first parallel voltage and the first parallel current of the first battery unit group fails to satisfy the load voltage and the load current, selecting a second battery unit group among the battery units based on respective close output voltages and respective discharge stress indexes of the battery units;

after connecting each battery unit of the second battery unit group in parallel, continuously detecting respective dynamic battery characteristic parameters of each battery unit of the second battery unit group;

judging whether a series voltage and a series current of a series connection of the first battery unit group and the second battery unit group satisfy the load voltage and the load current; and if it is judged that the series voltage and the series current of the series connection of the first battery unit group and the second battery unit group satisfy the load voltage and the load current, coupling the matrix intersection line module, the first battery unit group and the second battery unit group to form a second battery connection configuration, for the first battery unit group and the second battery unit group outputting at least the output voltage.

9. The programmable battery source method according to claim 8, further including:

sequencing the battery units in a list based on respective battery voltage parameters.

10. The programmable battery source method according to claim 8, wherein the first parallel voltage of the first battery unit group is higher than a second parallel voltage of the second battery unit group.

11. The programmable battery source method according to claim 8, further including:

obtaining respective discharge stress index of each battery unit of the first battery unit group based on respective dynamic battery characteristic parameters of each battery unit of the first battery unit group, to judge whether to skip at least a battery unit of the first battery unit group.

12. The programmable battery source method according to claim 8, wherein the step of continuously detecting respective dynamic battery characteristic parameters of each battery unit of the first battery unit group and the second battery unit group includes:

continuously detecting whether each current of each battery unit is within the permissible current range;

continuously detecting whether each voltage of each battery unit is higher than a discharge cutoff voltage;

continuously detecting whether each temperature of each battery unit is lower than a temperature threshold; and continuously detecting whether each battery capacity of each battery unit is higher than a battery capacity threshold.

13. The programmable battery source method according to claim 8, further comprising:

obtaining respective discharge stress index of each battery unit of the second battery unit group based on respective dynamic battery characteristic parameters of each battery unit of the second battery unit group, to judge whether to skip at least a battery unit of the second battery unit group.

* * * * *